United States Patent [19]

Pirolli

[11] 4,062,620
[45] Dec. 13, 1977

[54] DEVICE FOR CONNECTING OPTICAL FIBERS

[75] Inventor: Claude Pirolli, Rueil Malmaison, France

[73] Assignee: Telecommunications Radioelectriques et Telephoniques T.R.T., Paris, France

[21] Appl. No.: 665,953

[22] Filed: Mar. 11, 1976

[30] Foreign Application Priority Data

Mar. 25, 1975 France .................... 75.09289

[51] Int. Cl.² .......................................... G02B 5/14
[52] U.S. Cl. ............................ 350/96 C; 350/96 R
[58] Field of Search ................. 350/96 C, 96 R; 228/44.1, 44.5, 49, 250

[56] References Cited

U.S. PATENT DOCUMENTS

| | | | |
|---|---|---|---|
| 3,112,360 | 11/1963 | Gregg | 350/96 R |
| 3,912,574 | 10/1975 | Cherin et al. | 350/96 C |

OTHER PUBLICATIONS

Leighton, "Fiber Optic Shutter," IBM Tech. Disc. Bulletin, vol. 11, No. 8, Jan. 1969, pp. 912–913.
Zemon et al., "Eccentric Coupler for Optical Fibers . . .," Appl. Optics, vol. 14, No. 4, Apr. 1975, pp. 815–816.

*Primary Examiner*—John K. Corbin
*Assistant Examiner*—Stewart Levy
*Attorney, Agent, or Firm*—Frank R. Trifari; Carl P. Steinhauser

[57] ABSTRACT

A device for connecting optical fibers, the ends of which are provided with cylindrical envelopes of magnetic material which envelop the ends of the fibers and which are rigidly connected thereto. The connection device comprises a magnet having pole-shoes provided with means for guiding the said envelopes in order to position the end faces of the fibers one opposite the other in the air gap formed by the pole-shoes.

7 Claims, 3 Drawing Figures

DEVICE FOR CONNECTING OPTICAL FIBERS

The invention relates to a device for connecting i.e. coupling optical fibers.

There is a growing interest in the use of optical fibers of glass, silicon etc. for data transmission by modulation of the light energy transmitted through the said fibers.

One of the problems governing the development of such a technique lies in the manufacture of devices for connecting optical fibers, notably a device which is easy to use, inexpensive and at the same time enables lowloss light energy transmission. The manufacture of such a device is difficult because the diameter of the fibers is in the order of 10 $\mu$m to 100 $\mu$m, because the fibers are fragile and because, in order to realize the optical coupling with the required transmission efficiency, the end faces of the connected fibers must be very near to each other and very accurately centered. Moreover, mechanical stresses in the fibers must be avoided.

For known devices (for example, the device described in French Patent Specification No. 2,178,129), use is generally made of purely mechanical methods which do not fully satisfy requirements, notably in that connection is difficult to perform by non-specialized personnel.

The invention provides a novel connection device which enables the connection of optical fibers to be made in a simple and efficient manner.

In accordance with the invention, each end of a pair of fibers to be connected is rigidly connected to a piece of magnetic material, the connection device comprising a magnet or electromagnet having pole-shoes comprising means for guiding the said pieces of magnetic material in order to locate the end faces of said fibers one opposite the other in an air gap formed by the said poleshoes.

The pieces which are rigidly connected to the fibers are attracted towards each other by the magnetic force of attraction, and the connection of the fibers is realized with the required accuracy due to the mechanical construction of the connection device which is adapted to provide the said accuracy.

The pieces of magnetic material which are rigidly connected to the fibers preferably consist of cylindrical envelopes which envelop the ends of the fibers and leave the end face thereof free. These sleeves can be formed either by vapour deposition of magnetic material on the ends of the fibers or by securing a capillary tube around the end of each fiber by means of an adhesive.

Embodiments of the invention will be described by way of example with reference to the accompanying drawing wherein.

Figure 1:
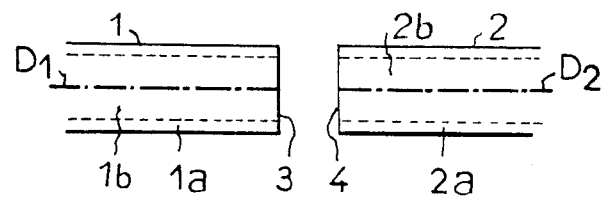
FIG. 1 shows the ends of two fibers which are to be connected to each other.

FIG. 1 shows the ends of two fibers 1 and 2 which are to be connected to each other. As is known, the optical fibers are each formed by a core $1b$, $2b$ having a refractive index $n$ for the transmission of light energy, and a cladding ($1a$, $2a$) which may have small thickness and has a refractive index $n - n$. The core and the cladding are rotation-symmetrical, and the tolerance in the concentricity of these parts is about 1 $\mu$m. It will be assumed hereinafter that near the ends of the fibers 1 and 2 the cores and the claddings have common axes $D_1$, $D_2$. The two end faces 3 and 4 of the cores of the two fibers are in principle perpendicular to the axes $D_1$, $D_2$. A connection device for optical fibers serves to locate the said faces 3 and 4 one opposite the other and to maintain this position, so that light energy can be transferred from one fiber to the other with only low attenuation, for example, less than 0.5 dB.

This imposes a number of restrictions on the construction of the device, some of which will be given hereinafter by way of example. In the case of fibers having a diameter of 100 $\mu$m, the two end faces 3 and 4 should be centered with an accuracy better than 5 $\mu$m in order to keep the attenuation smaller than 0.2 dB. The distance between the said end faces must be smaller than the radius of the end faces in order to keep the attenuation lower than 0.5 dB. The angle between the axes $D_1$, $D_2$ must be smaller than a few degrees.

The optical coupling is not necessarily optimal due to geometrical imperfections of the fiber end faces, concentricity errors between the cores and claddings, or excessively large tolerances in the construction of the connection device. Therefore, to improve the coupling it should be readily possible to rotate one fiber with respect to the other in this device. It is also necessary to avoid mechanical stresses in the fibers in order to keep the fibers connected to each other.

Figure 2:
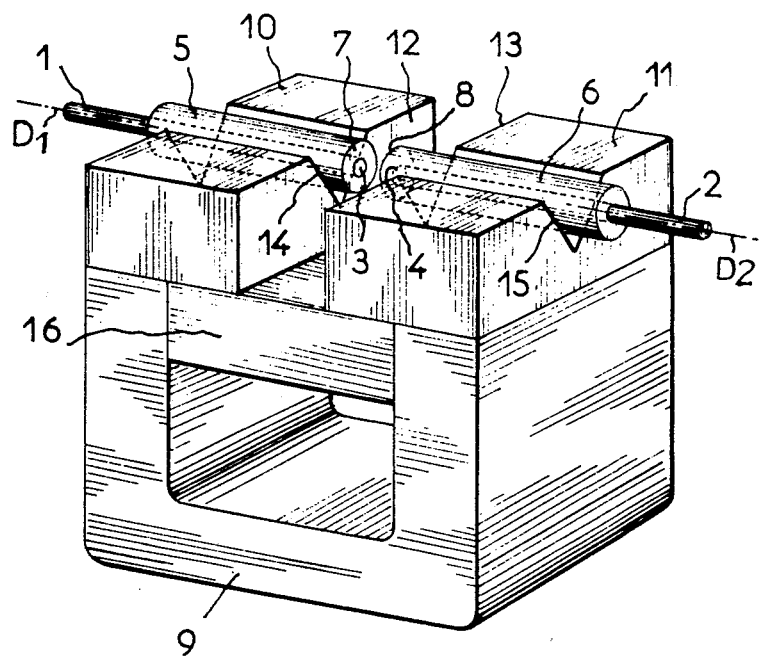
FIG. 2 is a perspective view of a flat connection device in accordance with the invention.

FIG. 2 illustrates an embodiment of the invention which is intended for the connection of two fibers. In accordance with a feature of the invention, the ends of the fibers 1 and 2 are enveloped by cylindrical envelopes 5 and 6 of magnetic material which are rigidly connected to the fibers. The envelopes are obtained, for example, by vapour-deposition of magnetic material on the ends of the fibers. The end faces 3 and 4 of the fibers are situated in the same plane as the end faces 7 and 8 of the envelopes 5 and 6. The connection device comprises a magnet 9 having pole-shoes 10, 11. The side faces 12, 13 of these poleshoes form an air gap in which the magnetic flux of the magnet is concentrated. The upper faces of the pole-shoes 10 and 11 are provided with V-shaped grooves 14, 15 which serve as guide means for the envelopes 5 and 6 in order to locate the end faces 3 and 4 of the fibers one opposite the other in the air gap. The pole-shoes 10 and 11 are preferably firmly secured (using means not shown) on a non-magnetic carrier so that the two grooves can be simultaneously provided in an accurately aligned manner. It will be obvious that the end faces 7 and 8 of the magnetic envelopes, though shown at a given distance from each other in the Figure, are moved towards each other by a magnetic force of attraction and are aligned to each other by means of the said force; the same is applicable to the end faces 3 and 4 of the fibers. The connection of the fibers is thus realized; a connection device of this kind satisfies the requirements set forth. Because the grooves can be very accurately aligned, as already described, and because the end faces of the envelopes and the fibers are accurately centered, the axes $D_1$, $D_2$ of the two fibers will be very accurately aligned and their end faces 3 and 4 will be accurately centered.

It is to be noted that one metal envelope can be readily rotated with respect to the other if this proves necessary to improve the optical connection between the two fibers. It is also to be noted that the two fibers thus remain connected to each other without a mechanical device being required because the magnetic force of attraction not only keeps the end faces of the envelopes and fibers pressed against each other, but also keep these envelopes in the grooves. Finally, it is to be noted that the fibers generally are accommodated in flexible sleeves in which the fibers can move fairly freely, and that the said flexible sleeves can be secured to the connection device, for example to the pole-shoes 10, 11.

The envelopes 5, 6 can also consist of capillary tubes which are secured around the ends of the fibers by means of an adhesive. The end faces 3, 4 of the fibres are not necessarily situated in the same plane as the end faces 7, 8 of the capillary tubes and can occupy, for example, a slightly withdrawn position. When the end faces 7, 8 are pulled against each other by magnetic force of attraction, a comparatively small space remains, then between the end faces 3, 4 of the fibers. Any mechanical stress is thus avoided between the ends of the fibers. In any case, and notably in the latter case, it is advisable to provide a quantity of liquid having substantially the same refractive index as the glass of the fibers cores 1b, 2b on the end faces 3 and 4 of the fibers in order to avoid reflection losses on these end faces after completion of the connection.

A connection device can be realized for a plurality of pairs of optical fibers by providing the upper faces of the pole-shoes 10, 11 with a plurality of parallel grooves, the number of grooves corresponding to the number of pairs of fibers to be connected. In a connection device of this kind the fibers of each pair can be readily connected or disconnected individually.

The magnetic pieces which are rigidly connected to the ends of the fibers (and which are formed in FIG. 2 by rotation-symmetrical cylinders 5 and 6 which envelop these ends), can have other shapes, provided that they are adapted to connect the two fibers to each other by magnetic attraction.

Figure 3:
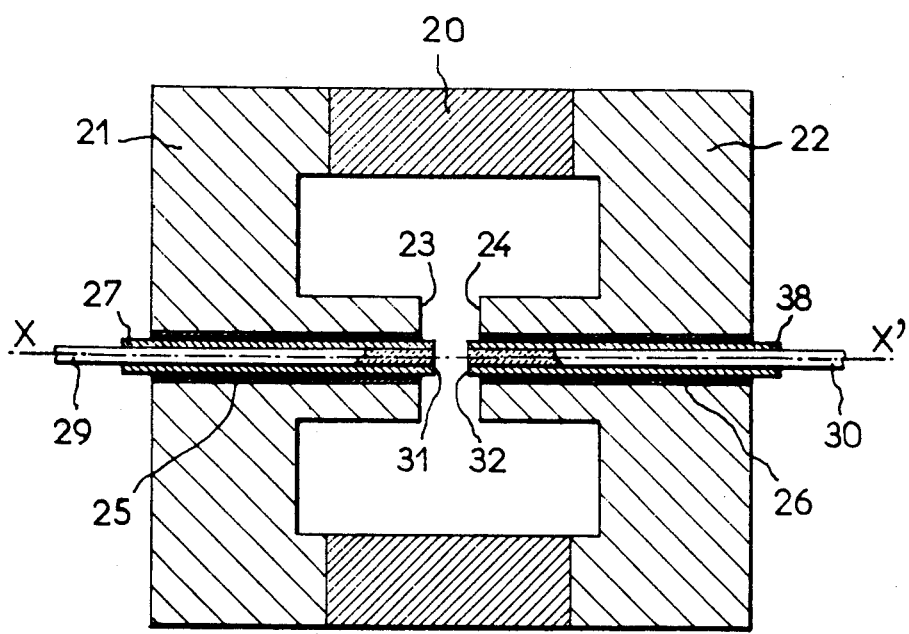
FIG. 3 is a sectional view of a cylindrical connection device in accordance with the invention.

Instead of the connection device as shown in FIG. 2 a connection device can be realized which has, for example, a cylindrical shape as shown in FIG. 3.

FIG. 3 is a sectional view taken along the axis XX' of this cylindrical connection device. All parts shown are rotation-symmetrical around the said axis. The connection device comprises an annular magnet 20 on which the two pole-shoes 21, 22 are arranged. The pole-shoes comprise faces 23, 24 which are situated one opposite the other and perpendicularly to the axis XX', the said faces 23, 24 forming an air gap in which the magnetic flux of the magnet 20 in concentrated. Two coaxial openings are provided in the pole-shoes 21, 22 in the direction of the axis XX'. These openings may have a diameter adapted to the diameter of envelopes 27, 38 to constitute directly means for guiding magnetic envelopes 27, 38, or better 28- see letter, enveloping the ends of the fibers 29, 30 which are to be connected. As is shown in FIG. 3, the envelopes 27, 38 are preferably guided by tubes 25, 26 of non-magnetic material which are rigidly secured in the openings provided in the pole-shoes 21, 22. It has been found that the making and breaking of the connection of the fibers is thus facilitated. The connection of the two fibers is performed in the manner already described, by utilizing the magnetic force of attraction existing between the end faces 31, 32 of the two magnetic envelopes 27, 38. It can be stated that the ingress of dust particles into a cylindrical connection device of this kind is substantially precluded.

It is alternatively possible to realize a cylindrical device for connecting a plurality of pairs of optical fibers on the basis of the arrangement shown in FIG. 3 by providing a plurality of openings in the sufficiently wide pole-shoes 21, 22 at the air gap, the number of openings corresponding to the number of pairs of fibers to be connected and the axes of these openings being parallel to each other.

On the basis of the described examples, it will be easy for those skilled in the art to develop other embodiments of the invention, for example utilizing poleshoes of a shape other than those described herein or other guide means.

What is claimed is:

1. A device for connecting optical fibers, comprising a member of magnetic material secured to each of opposing ends of a pair of fibers to be connected, and magnetic means including spaced pole-shoes defining an air-gap therebetween each of said pole pieces having axially aligned recesses forming a guide for locating the members of magnetic material therein and thereby axially aligning the end faces of said fibers in the air gap formed by the said poleshoes, said magnetic means moving said fibers into abutting relationship in said air-gap whereby said fibers are connected to one another.

2. A device as claimed in claim 1, wherein the members of magnetic material are cylindrical envelopes which envelop the ends of the fibers and leave the end faces thereof free.

3. A device as claimed in claim 2, wherein the envelopes consist of a desposition of magnetic material around the ends of the fibers.

4. A device as claimed in claim 2, wherein each envelop comprises a capillary tube of magnetic material which is secured to the desired location around the end of its fiber by means of an adhesive.

5. A device as claimed in claim 2 wherein the poleshoes are provided with grooves for guiding the envelopes which are rigidly connected to the fibers.

6. A device as claimed in claim 2 wherein the poleshoes are provided with openings for guiding the envelopes which are rigidly connected to the fibers.

7. A device as claimed in claim 6, wherein the poleshoes form an air gap which is symmetrical about an axis extending through the pole-shoes.

* * * * *